US012723463B2

(12) United States Patent
Hayami et al.

(10) Patent No.: US 12,723,463 B2
(45) Date of Patent: Sep. 1, 2026

(54) ARTICLE SHELF

(71) Applicant: Murata Machinery, Ltd., Kyoto (JP)

(72) Inventors: Yoshiyuki Hayami, Inuyama (JP); Satoshi Maeno, Inuyama (JP); Minehiro Tahara, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 167 days.

(21) Appl. No.: 18/834,644

(22) PCT Filed: Jan. 25, 2023

(86) PCT No.: PCT/JP2023/002245
§ 371 (c)(1),
(2) Date: Jul. 31, 2024

(87) PCT Pub. No.: WO2023/157588
PCT Pub. Date: Aug. 24, 2023

(65) Prior Publication Data

US 2025/0122011 A1 Apr. 17, 2025

(30) Foreign Application Priority Data

Feb. 15, 2022 (JP) ................................ 2022-021495

(51) Int. Cl.
*E06B 9/02* (2006.01)
*B65G 1/02* (2006.01)
(Continued)

(52) U.S. Cl.
CPC .................. *E06B 9/02* (2013.01); *B65G 1/02* (2013.01); *E05F 15/603* (2015.01); *E05F 15/70* (2015.01); *E05Y 2400/32* (2013.01)

(58) Field of Classification Search
CPC ... E06B 9/02; E06B 9/15; E06B 9/115; E06B 2009/6845; B65G 1/02; B65G 1/0485;
(Continued)

(56) References Cited

U.S. PATENT DOCUMENTS 10,480,242 B2 11/2019 Stehr
2008/0040246 A1 * 2/2008 Fukamachi .......... B65G 1/1373 705/29
(Continued)

FOREIGN PATENT DOCUMENTS

CN 106945984 A * 7/2017 ............ B65G 41/00
CN 206797343 U 12/2017
(Continued)

OTHER PUBLICATIONS

CN 108557357 machine translation (Year: 2018).*
Official Communication issued in corresponding European Patent Application No. 23756116.2, mailed on Dec. 19, 2025, 8 pages.

*Primary Examiner* — Abe Massad
(74) *Attorney, Agent, or Firm* — Keating & Bennett, LLP

(57) ABSTRACT

To prevent two frontages from being simultaneously opened on lower sides thereof, a rack includes a shelf, a first frontage, a second frontage, and a shutter. The shelf can hold an article at a position spaced from a floor surface. The first and second frontages face each other to access to the shelf. The shutter opens one of the two frontages and closes the other. When moving to switch the frontage to be closed, the shutter passes through a space between the floor surface and the shelf.

7 Claims, 11 Drawing Sheets

(51) Int. Cl.
*E05F 15/603* (2015.01)
*E05F 15/70* (2015.01)

(58) Field of Classification Search
CPC .. B65G 2207/40; B65G 1/1373; B65G 1/137; B65G 1/0407; E05F 15/70; E05F 15/603; E05Y 2400/32
See application file for complete search history.

(56) References Cited

U.S. PATENT DOCUMENTS

| | | | | |
|---|---|---|---|---|
| 2010/0325959 | A1* | 12/2010 | De Coi | E05F 15/74 49/28 |
| 2013/0106601 | A1* | 5/2013 | Leutenegger | E06B 9/88 340/532 |
| 2019/0264487 | A1* | 8/2019 | Zanolari | E06B 9/88 |
| 2023/0110733 | A1* | 4/2023 | Miyahara | E06B 9/18 160/266 |
| 2024/0195343 | A1* | 6/2024 | Byrnes | H02S 10/12 |
| 2025/0381674 | A1* | 12/2025 | Ferre | B25J 9/1687 |

FOREIGN PATENT DOCUMENTS

| | | | | | |
|---|---|---|---|---|---|
| CN | 108177914 | A | * | 6/2018 | B65G 1/04 |
| CN | 108557357 | A | * | 9/2018 | B65G 1/04 |
| CN | 208135230 | U | | 11/2018 | |
| JP | H11165811 | A | | 6/1999 | |
| JP | 2017001832 | A | | 1/2017 | |

* cited by examiner

ARTICLE SHELF

BACKGROUND OF THE INVENTION

1. Field of the Invention

The present invention relates to article shelves on which articles can be placed. In particular, the present invention relates to article shelves each including two frontages to transfer an article, and a safety device that closes the other frontage when one frontage is used to transfer the article.

2. Description of the Related Art

Conventionally, it is known that a conveyance device such as a stacker crane places an article on a shelf, and that an operator performs a predetermined operation (such as a picking operation) on the article placed on the shelf. The shelf used for this purpose has a frontage to transfer the article from the conveyance device to the shelf, and a frontage for the operator to perform the operation on the article placed on the shelf. Note that these two frontages are disposed to face each other.

In addition, the shelf described above is equipped with a safety device having a shutter, which closes the frontage on the operator side when transferring the article from the conveyance device to the shelf, and closes the frontage on the conveyance device side when the operator performs the operation on the article on the shelf (see, for example, JP-A-H11-165811).

SUMMARY OF THE INVENTION

When switching the frontage to be closed, the shutter of the conventional safety device moves from the frontage to be opened to the frontage to be closed along an upper portion of the shelf. Therefore, if the shutter stops before reaching the frontage to be closed due to an abnormality or the like, for example, the frontage on the side for the operator to perform the operation, and the frontage on the side for the conveyance device to transfer the article may be both open on lower sides thereof. If the both frontages are open on lower sides thereof, the operator can access the shelf while the conveyance device is transferring the article. Therefore, it is preferred to avoid the situation in which the both frontages are opened on lower sides thereof.

Example embodiments of the present invention prevent two frontages from being simultaneously opened on lower sides thereof, in an article shelf including two frontages facing each other.

Hereinafter, a plurality of example embodiments are described, and these example embodiments can be arbitrarily combined as necessary.

An article shelf according to an example embodiment of the present invention includes a shelf, two frontages, a shutter, and a drive assembly. The shelf can hold an article at a position spaced from a floor surface. The two frontages face each other in a direction perpendicular to a width direction of the shelf to access to the shelf. The shutter opens one of the two frontages and closes the other. When moving to switch the frontage to be closed, the shutter passes through a space between the floor surface and the shelf.

In the article shelf described above, when the shutter moves to switch the frontage to be closed, the shutter passes through the space between the floor surface and the shelf, to move from one frontage to the other frontage. In this way, even if the shutter stops during movement from one frontage to the other frontage, at least one of the two frontages is closed by the shutter on its lower side, and it is possible to prevent two frontages from being simultaneously opened on lower sides thereof. In addition, as the shutter passes through the space between the shelf and the floor surface, to switch the frontage, if an automated guided vehicle and/or a human or the like exist in the space between the shelf and the floor surface, switching of the frontage cannot be performed. As a result, without detecting whether or not an automated guided vehicle and/or a human or the like exist in the space between the shelf and the floor surface using a sensor or the like, it is possible to determine whether or not the frontage can be switched.

The article shelf may further include a drive assembly. The drive assembly may include a pair of drivers. The pair of drivers are positioned with an interval therebetween that is larger than a width of the shelf, to move the shutter while supporting both end portions of the shutter. Each of the drivers may include four rotating structures and an endless structure. The four rotating structures are provided at four corners along a movement path of the shutter. The endless structure is wrapped around the four rotating structures, to support an end of the shutter. In this way, the shutter can be equipped to the article shelf, using a simple structure of the rotating structures and the endless structure.

The drive assembly may move the shutter by rotating one of the four rotating structures of the pair of drivers. In this way, it is possible to drive the shutter by a simple structure of rotating one rotating structure.

The article shelf described above may further include two sensors to detect the shutter. The two sensors are side by side along the movement path of the shutter. In this case, the shutter may continue to move if the two sensors both detect the shutter, while it may stop if one of the two sensors does not detect the shutter. In this way, it is possible to appropriately move the shutter by a simple structure in which only the two sensors are provided.

The article shelf described above may further include three sensors to detect the shutter. The three sensors are side by side along the movement path of the shutter. In this way, more advanced movement of the shutter can be realized.

The shutter may have a length corresponding to a sum of heights of the frontages and a length in a direction perpendicular to the width direction of the shelf. In addition, the sensors may be located in a vicinity of one of the two frontages. Further, it may be determined whether or not to stop the shutter if one of the two sensors does not detect the shutter, based on a movement direction of the shutter. In this way, by changing functions of the two sensors based on the movement direction of the shutter, it is possible to appropriately move the shutter with a small number of sensors.

The shutter may have a length corresponding to a sum of heights of the frontages and a length in the direction perpendicular to the width direction of the shelf. In addition, three sensors may be located in a vicinity of one of the frontages. Further, if the shutter becomes undetected by one of the three sensors, it may be determined whether or not to decrease the moving speed of the shutter or to stop the shutter, based on the movement direction of the shutter. In this way, by switching functions of the three sensors based on the movement direction of the shutter, more advanced movement of the shutter can be realized.

If a state of the shutter cannot be recognized using the sensors, the state of the shutter may be recognized by circularly moving the shutter to cause the sensors to detect the shutter. In this way, even in the state where the state of the shutter cannot be recognized when the device is recovered from an abnormal state or when the device starts, the state of the shutter can be recognized by the operation described above.

It is possible to prevent two frontages from being simultaneously opened on lower sides thereof.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

1. First Example Embodiment

Figure 1:
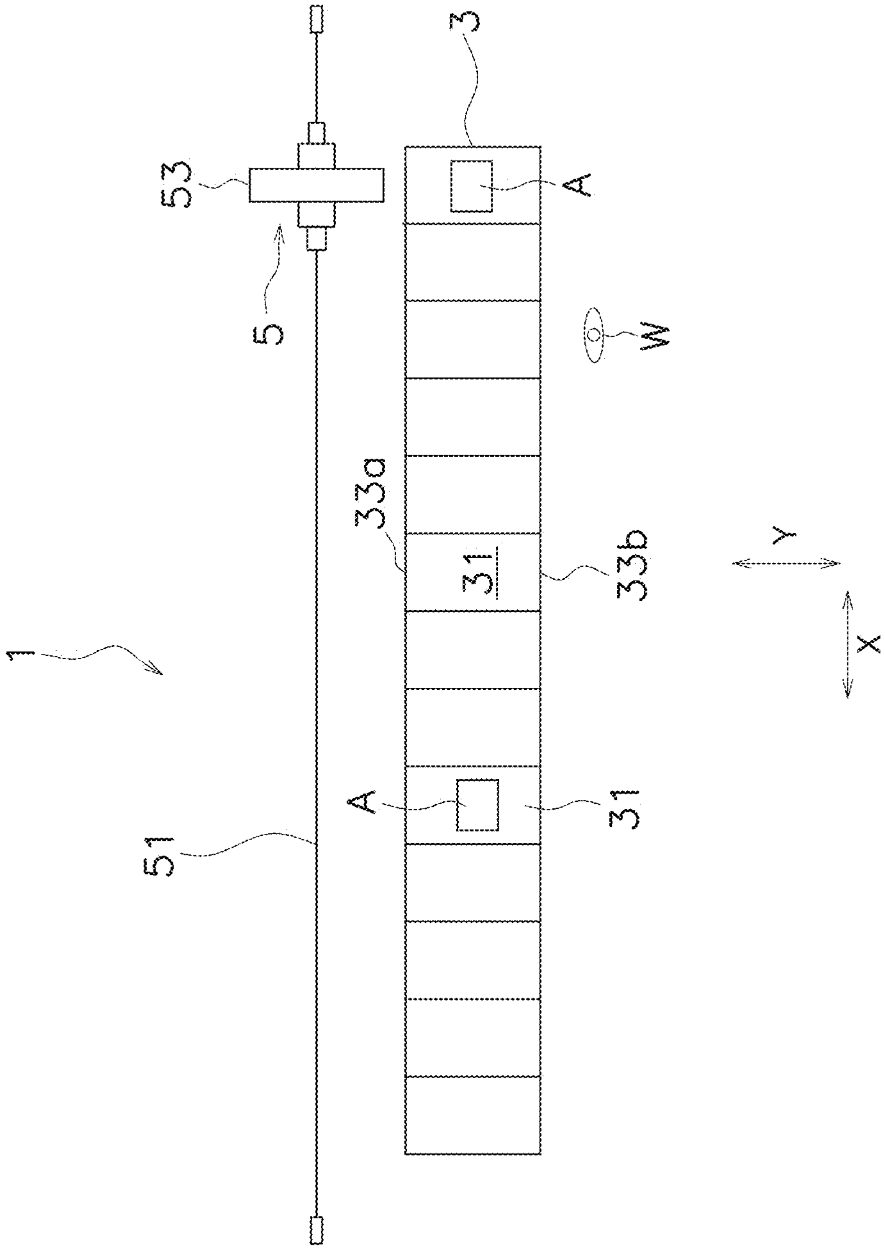
FIG. 1 is a plan view of an automated warehouse.
Figure 2:
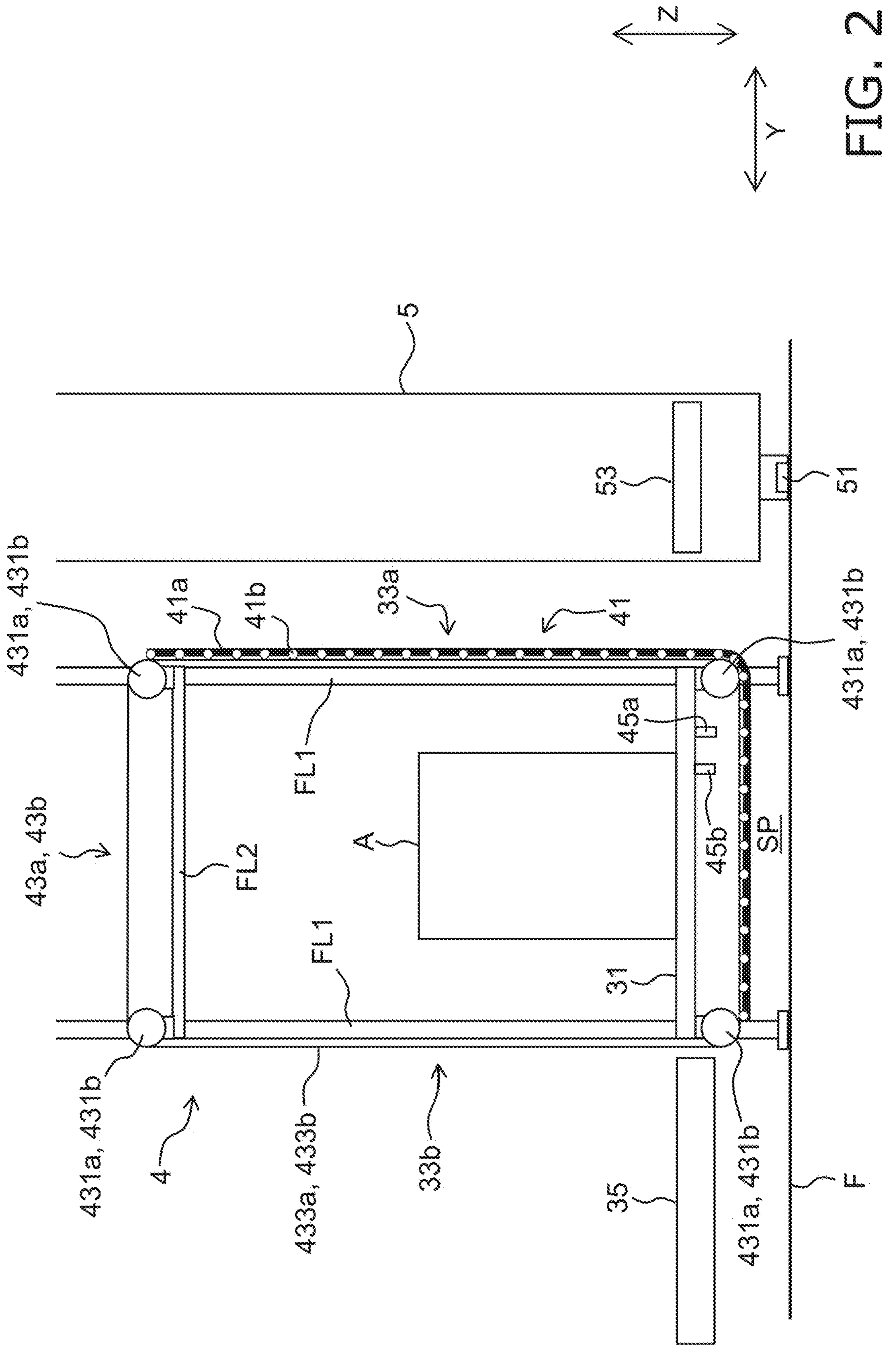
FIG. 2 is a diagram of a safety device viewed from a rack extending direction.
Figure 3:
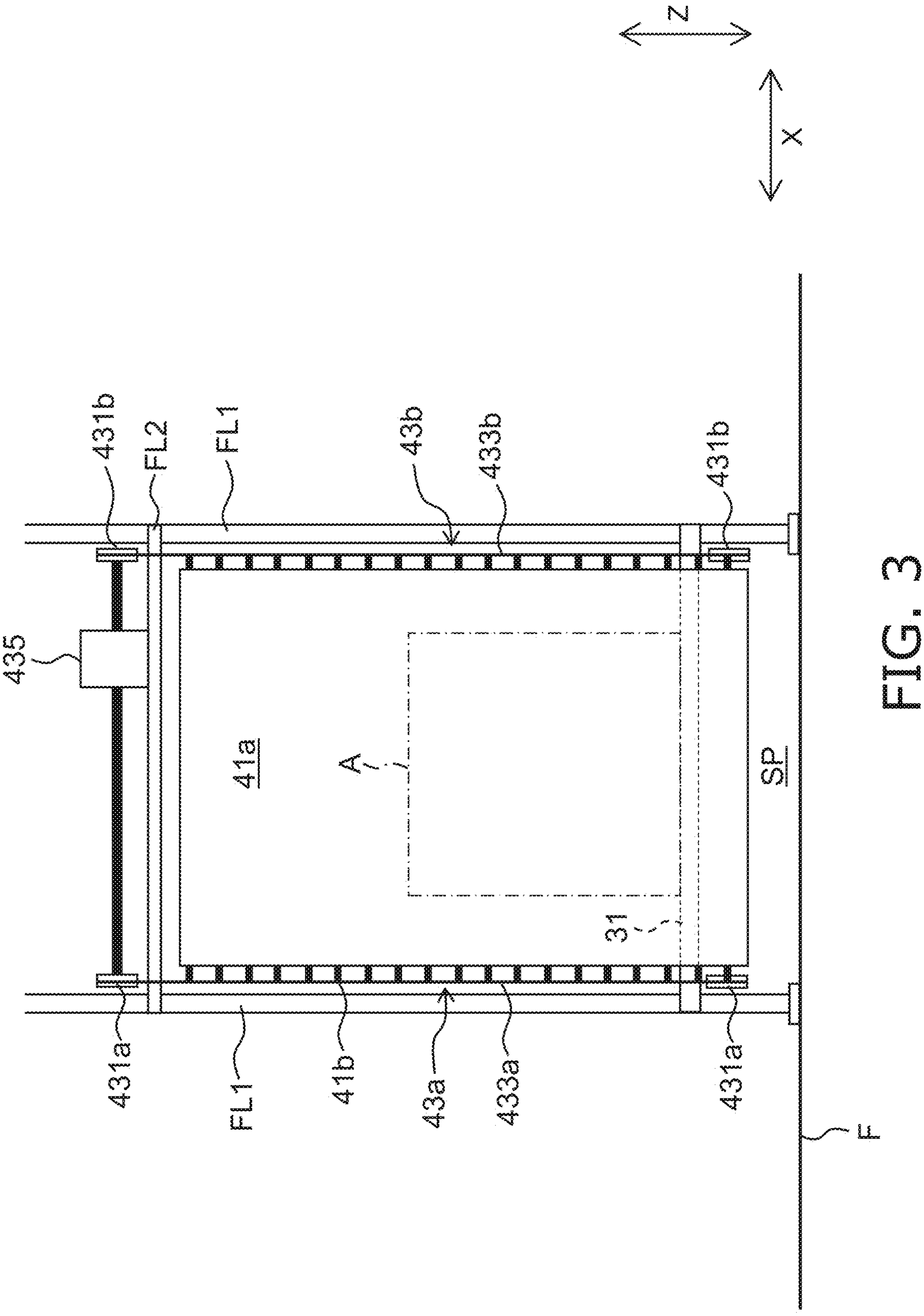
FIG. 3 is a diagram of a safety device viewed from a first frontage side.

With reference to FIGS. 1 to 3, an automated warehouse 1 including an article shelf according to an example embodiment of the present disclosure is described. FIG. 1 is a plan view of the automated warehouse 1. FIG. 2 is a diagram of a safety device 4 viewed from an extending direction of a rack 3. FIG. 3 is a diagram of the safety device 4 viewed from a first frontage 33*a* side. In the following description, the left and right direction in FIG. 1 is defined as an X direction, the up and down direction in FIG. 1 is defined as a Y direction, and the direction perpendicular to the paper of FIG. 1 (i.e., a height direction) is defined as a Z direction. The automated warehouse 1 may be located at a logistics base such as a factory or a storage facility, for example, and may be a facility in which storing, loading, and unloading of articles A can be performed. The articles A that can be stored, loaded, and unloaded in the automated warehouse 1 include, for example, a package itself, packages placed on a pallet, and the like. The automated warehouse 1 includes the rack 3 (an example of the article shelf) and a conveyance device 5.

The rack 3 is a facility that is configured to store the articles A. The rack 3 includes a plurality of shelves 31 on which the articles A can be placed. The plurality of shelves 31 are arranged along the X direction. The shelf 31 is fixed to a first frame FL1 extending in the Z direction, at a position spaced apart upward from a floor surface F by a predetermined distance, and can place the article A at the position spaced apart from the floor surface F. Note that the rack 3 may further include a plurality of shelves to hold the articles A, arranged in the Z direction (the height direction).

Note that the articles A to be placed on the shelf 31 have various sizes. For instance, the length of the article A may be longer than the length of the shelf 31 in the Y direction or may be shorter than the same.

The rack 3 includes two frontages, i.e., the first frontage 33*a* and a second frontage 33*b*, to access to each shelf 31. The first frontage 33*a* is disposed on a side of the shelf 31 facing the conveyance device 5. The first frontage 33*a* is used when transferring the article A from the conveyance device 5 to the shelf 31, or from the shelf 31 to the conveyance device 5.

The second frontage 33*b* is disposed to face the first frontage 33*a* via the shelf 31 in the Y direction. In other words, the second frontage 33*b* is disposed on a side of the shelf 31 opposite to the side facing the conveyance device 5. The second frontage 33*b* is used when an operator W makes access to the shelf 31. Specifically, the operator W can enter the shelf 31 from an external workbench 35 through the second frontage 33*b*. In addition, the operator W can move from the shelf 31 to the external workbench 35 through the second frontage 33*b*. In this way, for example, the operator W can enter the shelf 31 and perform a predetermined operation on the article A placed on the shelf 31. For instance, it is possible to move the article A from the shelf 31 to the outside. In addition, it is possible to place the article A onto the shelf 31 from the outside.

In addition, the operator W existing outside the rack 3 can perform picking (so-called "back surface picking") of the article A placed on the shelf 31, using the second frontage 33*b*.

The second frontage 33*b* may have a size such that the operator W can pass through, or may have a size such that a vehicle such as a forklift can pass through. In the latter case, not only the operator W but also the vehicle can enter the shelf 31.

In addition, the rack 3 is equipped with the safety device 4 that is configured to open the frontage that is currently in use while closing the frontage that is currently not in use, between the first frontage 33*a* and the second frontage 33*b*. A specific structure of the safety device 4 will be described later in detail.

The conveyance device 5 conveys the article A among the plurality of shelves 31, a storage station, and/or a retrieval station. Specifically, the conveyance device 5 moves along a guide rail 51 laid along the X direction (i.e., the arrangement direction of the plurality of shelves 31), to convey the article A. The conveyance device 5 can be a stacker crane, for example.

The conveyance device 5 includes a transfer device 53. The transfer device 53 is configured to transfer the article A between the conveyance device 5 and the shelf 31, the storage station, or the retrieval station. The transfer device 53 holds the article A, extends from the transfer device 53 to the shelf 31 through the first frontage 33*a* in the Y direction, and then releases holding of the article A, so that the article A can be transferred from the conveyance device 5 to the shelf 31. On the other hand, the transfer device 53 extends from the transfer device 53 to the shelf 31 through the first frontage 33*a*, holds the article A placed on the shelf 31, and then retracts from the shelf 31 to the transfer device 53 while keeping holding the article A, so that the article A can be transferred from the shelf 31 to the conveyance device 5. As this transfer device 53, for example, there is a device including a slide fork that can extend and retract in the Y direction and has an upper portion on which the article A can be placed, or a device having an arm that can extend and retract in the Y direction to which a structure to hold the article A is provided.

Note that FIG. 1 illustrates an example of the automated warehouse 1, in which one rack 3 and one conveyance device 5 are arranged side by side in the Y direction, but the structure of the automated warehouse 1 is not limited to this. In another example of the automated warehouse 1, a plurality of the racks 3 and a plurality of the conveyance devices 5 may be alternately arranged side by side in the Y direction.

Hereinafter, with reference to FIGS. 2 and 3, a structure of the safety device 4 provided to each shelf 31 of the rack 3 is described. The safety device 4 includes a shutter 41 and a drive assembly 43.

The shutter 41 opens one of the first frontage 33*a* and the second frontage 33*b*, to access to the shelf 31, while it closes the other frontage, to inhibit access to the shelf 31. The shutter 41 includes a shutter structure 41*a* and shutter support structures 41*b*.

The shutter structure 41*a* is a flat structure having a predetermined width and length. The width of the shutter structure 41*a* larger than the width (X direction length) of a placing portion of the article A on the shelf 31. On the other hand, the length of the shutter structure 41*a* (the length in the Y direction and the Z direction) corresponds to a sum of the lengths (i.e., the heights) of the frontages (the first frontage 33*a* or the second frontage 33*b*) in the Z direction and the length of the shelf 31 in the Y direction (the direction perpendicular to the width direction). Having this size, the shutter structure 41*a* can cover the entire frontage and the entire lower portion of the shelf 31 at the same time, when its one end in the length direction reaches the uppermost portion of the frontage.

Note that the length of the shutter structure 41*a* is not required to have the above size as long as security can be assured in the automated warehouse 1. For instance, if the shelf 31 is long in the Y direction, the shutter structure 41*a* is not always required to have the length that covers the entire frontage and the entire lower portion of the shelf 31.

The shutter support structure 41*b* is a rod-shaped structure that is configured to support the shutter structure 41*a*. A plurality of the shutter support structures 41*b* are arranged side by side in the length direction of the shutter structure 41*a*, and are fixed to the shutter structure 41*a* except for their both end portions. The both end portions of the shutter support structures 41*b* are each fixed to an endless structure of a driver. As the both end portions of the shutter support structures 41*b* are each fixed to the endless structure, the shutter 41 (the shutter structure 41*a*) can move along with the movement of the endless structures of the driver.

The drive assembly 43 drives the shutter 41. The drive assembly 43 includes a pair of drivers 43*a* and 43*b*. The pair of drivers 43*a* and 43*b* are positioned with a space therebetween, which is larger than the width of the placing portion of the article A on the shelf 31. Specifically, viewed from the first frontage 33*a*, the driver 43*a* is disposed on the left side, while the driver 43*b* is disposed on the right side. The pair of drivers 43*a* and 43*b* moves the shutter 41, while supporting the both end portions of the shutter 41 (the both end portions of the shutter support structures 41*b*) in the width direction.

The pair of drivers 43*a* and 43*b* include four rotating structures 431*a* and 431*b* and endless structures 433*a* and 433*b*, respectively. The four rotating structures 431*a* and 431*b* are disposed at four corners along a movement path of the shutter 41. The rotating structures 431*a* and 431*b* are sprockets, pulleys, or the like, for example.

Specifically, two rotating structures 431*a* among the four rotating structures 431*a* are disposed in a rotatable manner about an X axis, in the lower portion of the shelf 31 at the end portions in the Y direction on the left side viewed from the first frontage 33*a*. The other two rotating structures 431*a* are disposed in a rotatable manner about the X axis, at the end portions of a second frame FL2 in the Y direction on the left side viewed from the first frontage 33*a*. The second frame FL2 is fixed to the first frame FL1 at the upper portion of the shelf 31 of the rack 3.

On the other hand, two rotating structures 431*b* among four rotating structures 431*b* are disposed in a rotatable manner about the X axis, at the lower portion of the shelf 31 at the end portions in the Y direction on the right side viewed from the first frontage 33*a*. The other two rotating structures 431*b* are disposed in a rotatable manner about the X axis, at the end portions of the second frame FL2 in the Y direction on the right side viewed from the first frontage 33*a*.

The endless structure 433*a* is wrapped around the four rotating structures 431*a* disposed on the left side viewed from the first frontage 33*a*, and moves when the four rotating structures 431*a* rotate about the X axis. In addition, the endless structure 433*a* fixes the end portions of the shutter support structures 41*b* on the left side, to support the shutter 41 on the left side.

The endless structure 433*b* is wrapped around the four rotating structures 431*b* disposed on the right side viewed from the first frontage 33*a*, and moves when the four rotating structures 431*b* rotate about the X axis. In addition, the endless structure 433*b* fixes the end portions of the shutter support structures 41*b* on the right side, to support the shutter 41 on the right side.

If the rotating structures 431*a* and 431*b* are sprockets, the endless structures 433*a* and 433*b* are chains, for example. On the other hand, if the rotating structures 431*a* and 431*b* are pulleys, the endless structures 433*a* and 433*b* are endless belt structures such as timing belts, for example.

With the structure described above, by rotating the rotating structures 431*a* and 431*b* about the X axis, it is possible to move the shutter 41 supported by the endless structures 433*a* and 433*b*, over the first frontage 33*a*, a space SP between the lower portion of the shelf 31 and the floor surface F, the second frontage 33*b*, and the upper portion of the second frame FL2.

In addition, the drive assembly 43 further includes a drive supplier 435. The drive supplier 435 supplies driving force to rotate one of the four rotating structures 431*a* and one of the rotating structures 431*b* facing the one of the rotating structures 431*a* in the X direction. The drive supplier 435 includes a motor and a drive converter to convert rotation of the motor into rotation of the rotating structures about the X axis, for example.

With the structure described above, the drive assembly 43 can move the shutter 41 supported by the endless structures 433*a* and 433*b*, with a simple structure in which the drive supplier 435 causes one of the four rotating structures to rotate.

The safety device 4 further includes a first sensor 45*a* and a second sensor 45*b*. The first sensor 45*a* and the second sensor 45*b* are each a sensor that is configured to detect the shutter 41. The first sensor 45*a* and the second sensor 45*b* may each be a photoelectric sensor that detects the shutter 41 when the shutter 41 blocks the light, for example.

The first sensor 45*a* and the second sensor 45*b* are disposed side by side along the movement path of the shutter 41 in the space SP between the shelf 31 and the floor surface F, in a vicinity of the first frontage 33*a* in the lower portion of the shelf 31. Specifically, the first sensor 45*a* is disposed on the side close to the first frontage 33*a*, while the second sensor 45*b* is disposed on the side apart from the first frontage 33*a*.

By arranging the two sensors, i.e., the first sensor 45*a* and the second sensor 45*b*, side by side along the movement path of the shutter 41, the movement direction and the position of the shutter 41 can be detected based on whether or not the shutter 41 is detected by which one of the two sensors. The method of detecting the movement direction and the position of the shutter 41 using the two sensors will be described later.

Figure 4:
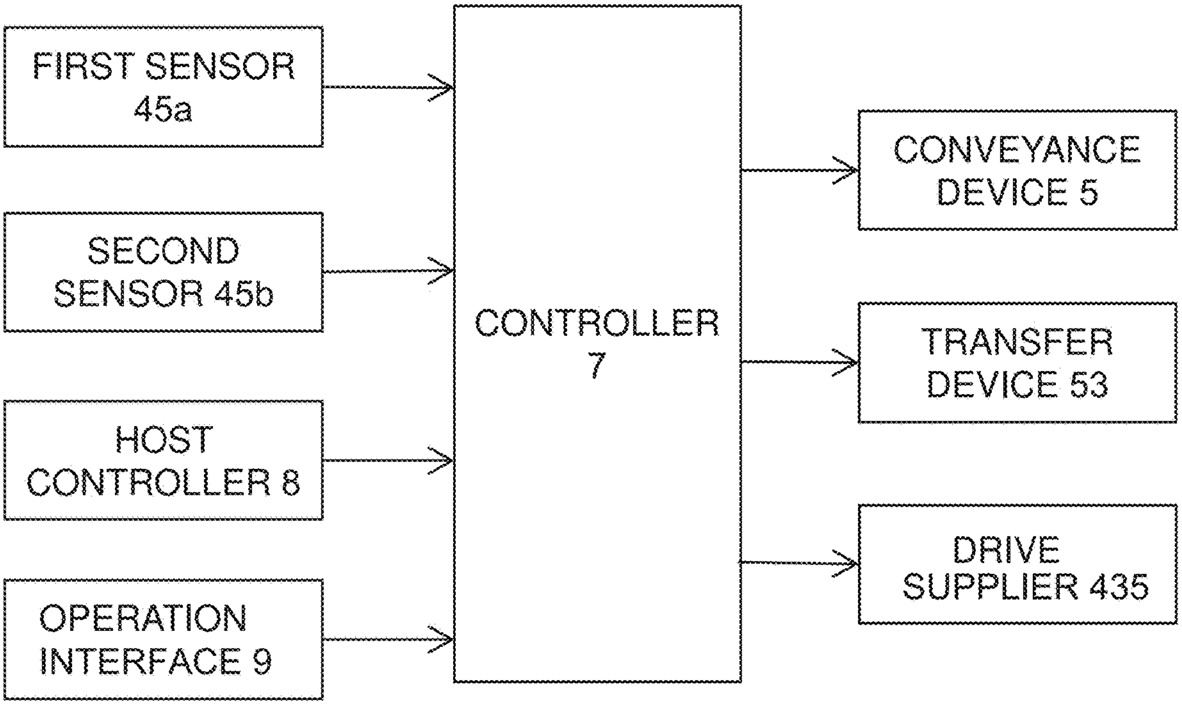
FIG. 4 is a diagram illustrating a control structure of the automated warehouse.

The automated warehouse 1 further includes a controller 7. The controller 7 is a computer system including a CPU, a storage device (such as a RAM and a ROM), and various interfaces, to control individual components of the automated warehouse 1. The control of individual components of the automated warehouse 1 may be realized by a program, which is stored in the storage device of the controller 7 and can be executed by the controller 7. In addition, a portion of an entirety of the control of the individual components may be realized by hardware of the controller 7. Hereinafter, with reference to FIG. 4, a control structure of the automated warehouse 1 by the controller 7 is described. FIG. 4 is a diagram illustrating the control structure of the automated warehouse 1.

The controller 7 is configured or programmed to controls the travel of the conveyance device 5 and the transfer of the article A by the transfer device 53, based on a host controller 8. The host controller 8 is a computer system that administrates the articles A in the automated warehouse 1.

The controller 7 is configured or programmed to control the drive supplier 435 to control movement of the shutter 41, based on a command from the host controller 8 and/or an operation unit 9. For instance, if the host controller 8 issues a command to transfer the article A from the conveyance device 5 to the shelf 31 or in the opposite direction, the controller 7 outputs a signal to the drive supplier 435, to move the shutter 41 in the direction of opening the first frontage 33*a* while closing the second frontage 33*b*.

On the other hand, for example, if the operator W uses the operation unit 9 to make a predetermined operation (e.g., to push a button on the operation unit 9), the controller 7 determines that the operator W will do an operation in the shelf 31, and outputs a signal to the drive supplier 435, to move the shutter 41 in the direction of opening the second frontage 33*b* while closing the first frontage 33*a*.

Further, the controller 7 recognizes a state of the shutter 41 based on detection results of the shutter 41 by the first sensor 45*a* and the second sensor 45*b*, and output to the drive supplier 435 a signal to control movement of the shutter 41, based on the recognized state of the shutter 41.

Hereinafter, an operation of the automated warehouse 1 having the structure described above is described. First, the transfer operation of the article A between the conveyance device 5 and the shelf 31 is described. For instance, when the host controller 8 issues a command to transfer the article A between the conveyance device 5 and the shelf 31, the controller 7 moves the shutter 41 to close the second frontage 33*b* and to open the first frontage 33*a*.

Figure 5A:
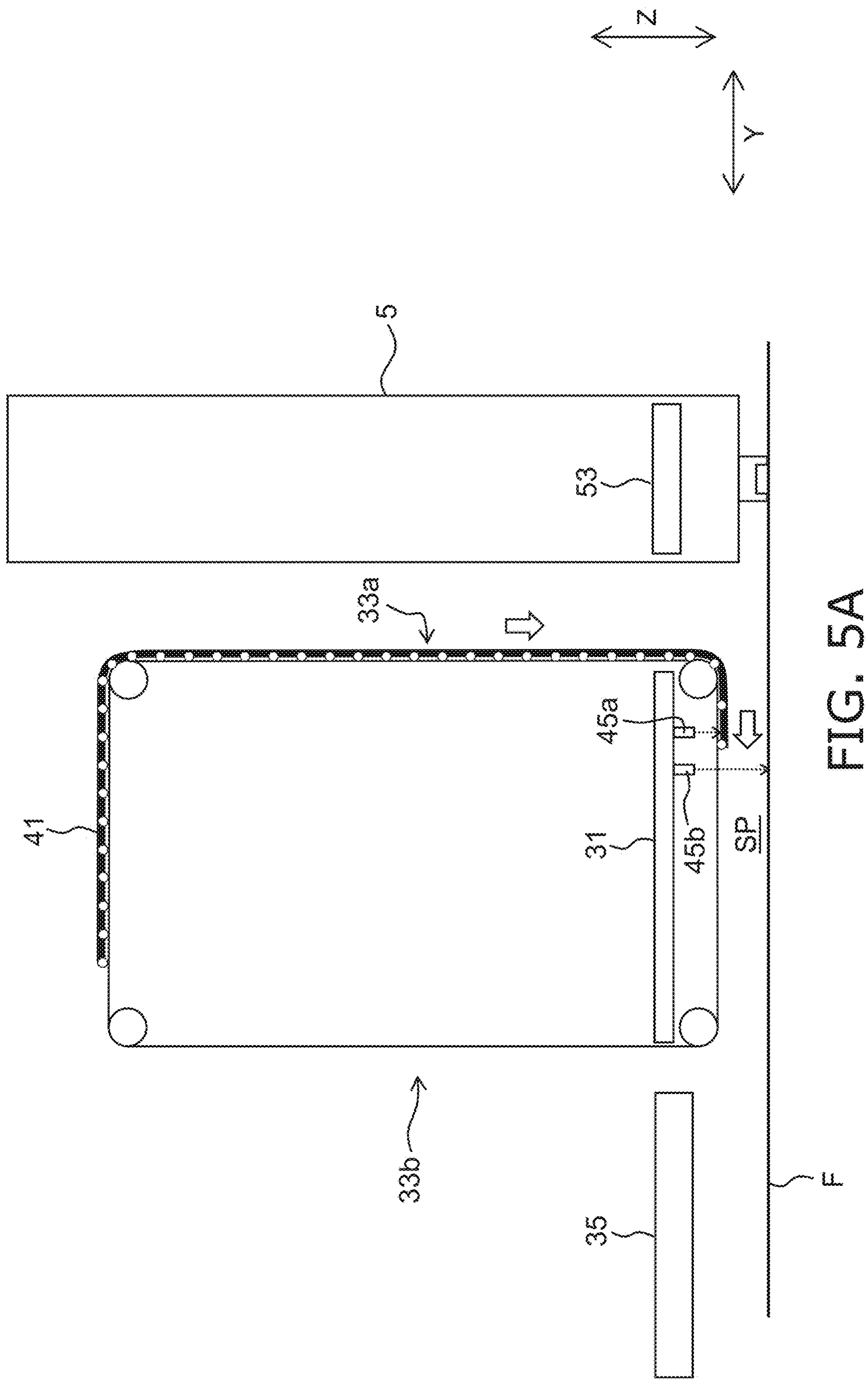
FIG. 5A is a diagram illustrating a state where the first frontage is closed by a shutter.

For instance, before the above command is issued, if the first frontage 33*a* is closed as illustrated in FIG. 5A, in order to switch the frontage to be closed to the second frontage 33*b*, the controller 7 moves the shutter 41 in the direction from the first frontage 33*a* to the second frontage 33*b*. In this case, the controller 7 causes the shutter 41 to pass through the space SP between the shelf 31 and the floor surface F, so that the shutter 41 moves to the second frontage 33*b*. FIG. 5A is a diagram illustrating a state where the first frontage 33*a* is closed by the shutter 41.

As illustrated in FIG. 5A, when the first frontage 33*a* is closed by the shutter 41, the first sensor 45*a* on the side close to the first frontage 33*a* detects the shutter 41, while the second sensor 45*b* on the side close to the second frontage 33*b* does not detect the shutter 41.

Figure 5B:
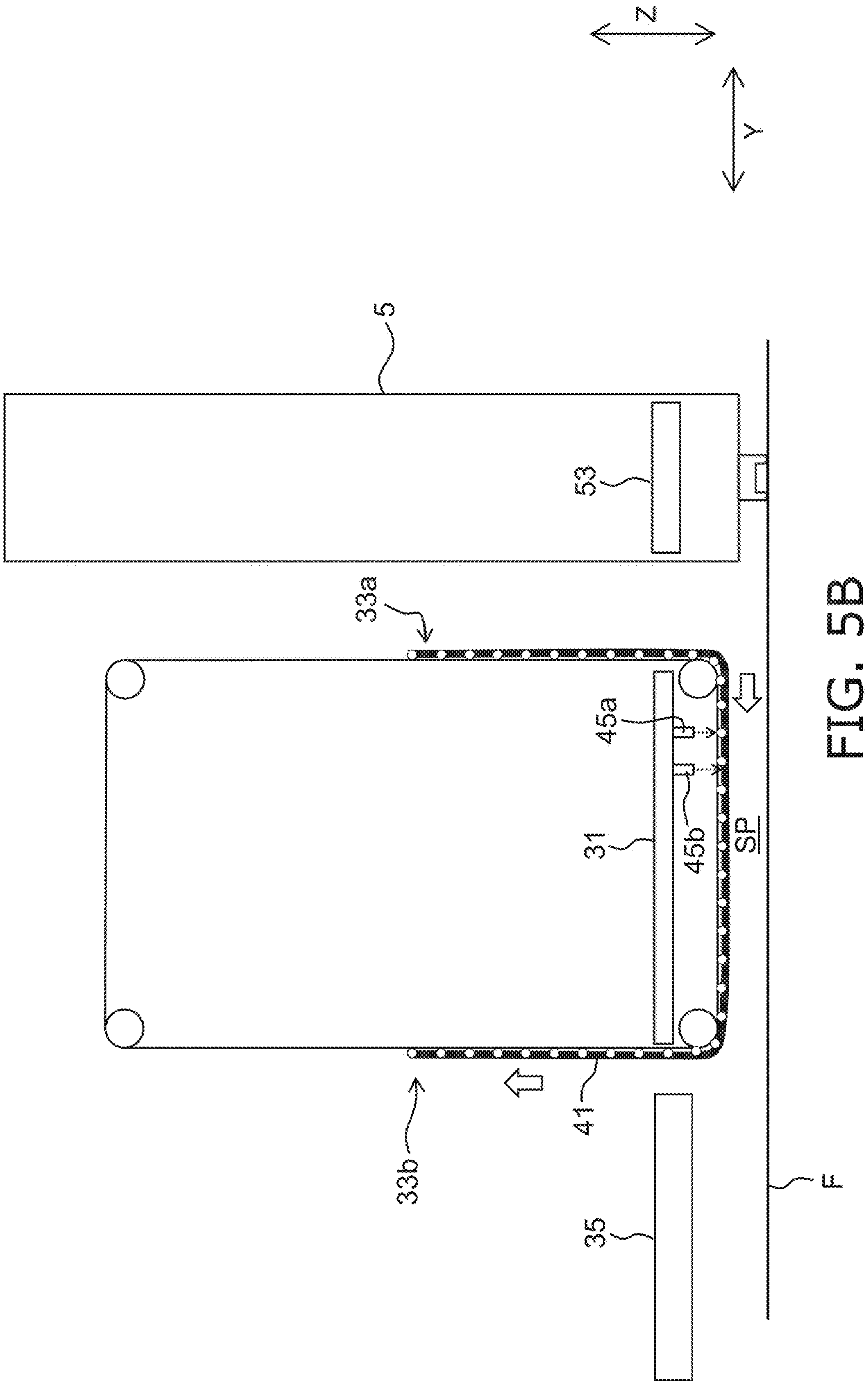
FIG. 5B is a diagram illustrating a state where the shutter is on the move to a second frontage.

When the shutter 41 starts moving and is passing through the space SP between the shelf 31 and the floor surface F, both the first sensor 45*a* and the second sensor 45*b* detect the shutter 41. However, in this case, as illustrated in FIG. 5B, the second frontage 33*b* is not completely closed by the shutter 41, and the first frontage 33*a* is not completely opened. Therefore, if both the first sensor 45*a* and the second sensor 45*b* detect the shutter 41, the controller 7 determines that the shutter 41 is on the move to the second frontage 33*b*, and continues the movement of the shutter 41 to the second frontage 33*b*. FIG. 5B is a diagram illustrating a state where the shutter 41 is on the move to the second frontage 33*b*.

Figure 5C:
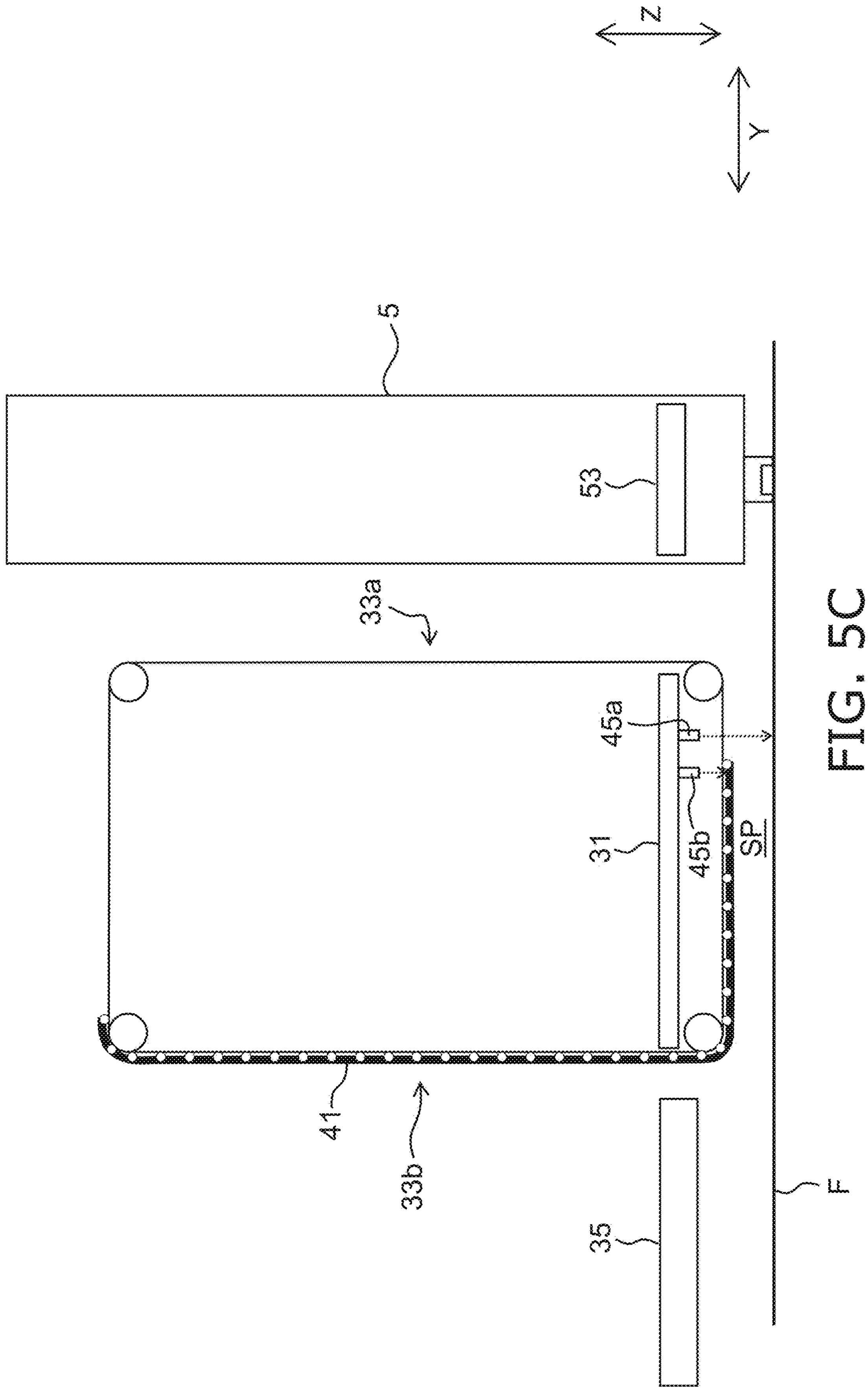
FIG. 5C is a diagram illustrating a state where the second frontage is closed by the shutter.

After that, as the shutter 41 moves more, the state arises where the second sensor 45*b* on the side close to the second frontage 33*b* detects the shutter 41, while the first sensor 45*a* on the side close to the first frontage 33*a* does not detect the shutter 41. In this case, as illustrated in FIG. 5C, the second frontage 33*b* is closed by the shutter 41, while the first frontage 33*a* is opened. Therefore, if the state where both the first sensor 45*a* and the second sensor 45*b* detect the shutter 41 changes to the state where the second sensor 45*b* detects the shutter 41 while the first sensor 45*a* does not detect the shutter 41, the controller 7 determines that the shutter 41 has closed the second frontage 33*b*, and stops the movement of the shutter 41 to the second frontage 33*b*. FIG. 5C is a diagram illustrating the state where the second frontage 33*b* is closed by the shutter 41.

In the state where the first frontage 33*a* is opened while the second frontage 33*b* is closed as illustrated in FIG. 5C, the conveyance device 5 can extend the transfer device 53 to the shelf 31, to transfer the article A from or to the shelf 31. On the other hand, the operator W cannot enter the shelf 31 because the second frontage 33*b* is closed. In this way, the safety device 4 inhibit the operator W from making access to the shelf 31 while the conveyance device 5 makes access to the shelf 31, to ensure safety.

Next, an operation when causing the operator W to make access to the shelf 31 is described. For instance, when the operator W presses a button or the like on the operation unit 9 to notify that the operator W want to make access to the shelf 31, the controller 7 moves the shutter 41 to close the first frontage 33*a* and to open the second frontage 33*b*.

Figure 6A:
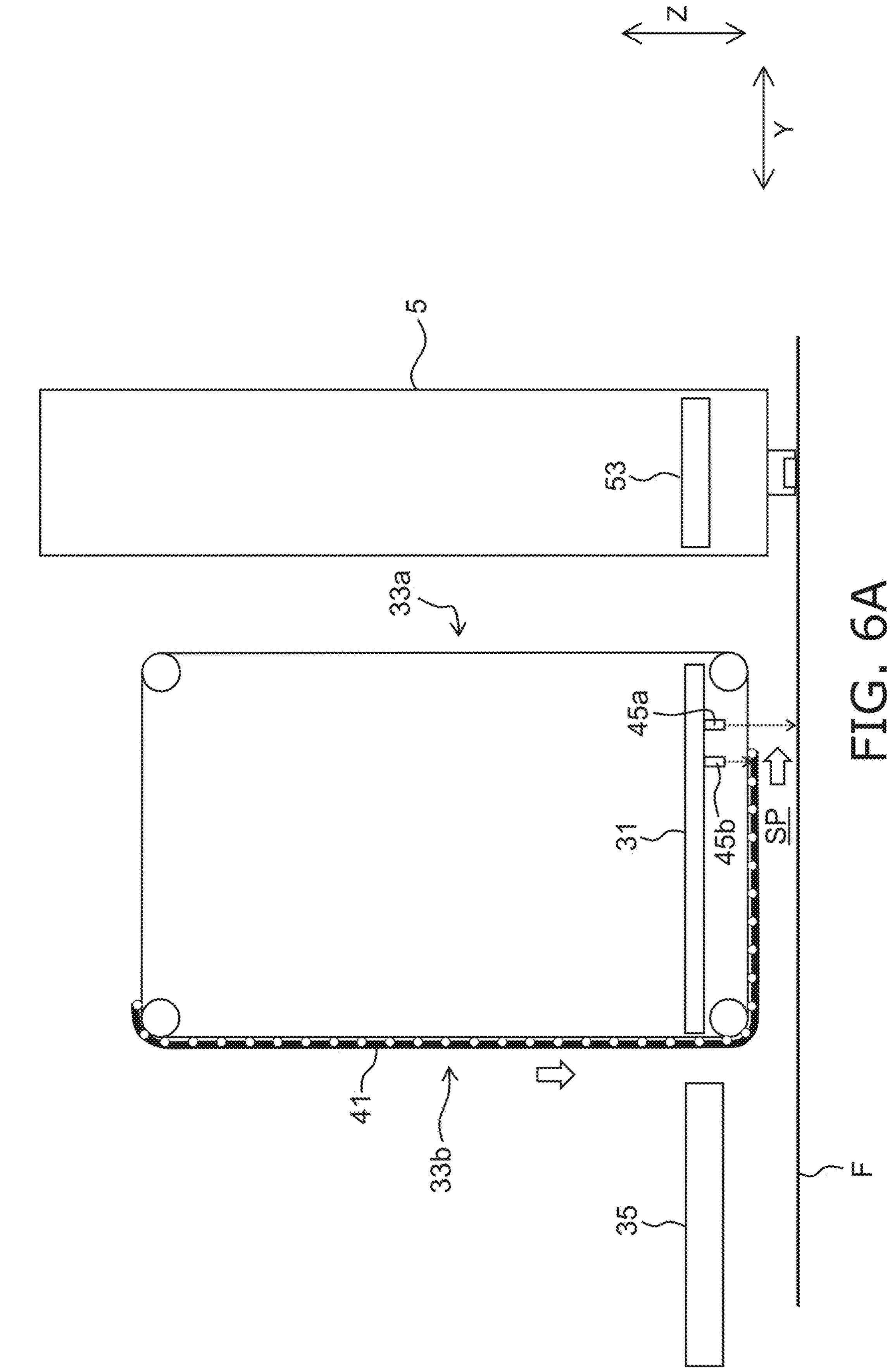
FIG. 6A is a diagram illustrating a state where the second frontage is closed by the shutter.

For instance, before the above notification is performed, if the second frontage 33*b* is closed as illustrated in FIG. 6A, in order to switch the frontage to be closed to the first frontage 33*a*, the controller 7 moves the shutter 41 in the direction from the second frontage 33*b* to the first frontage 33*a*. In this case, the controller 7 causes the shutter 41 to pass through the space SP between the shelf 31 and the floor surface F, so that the shutter 41 moves to the first frontage 33*a*. FIG. 6A is a diagram illustrating a state where the second frontage 33*b* is closed by the shutter 41.

As illustrated in FIG. 6A, when the second frontage 33*b* is closed by the shutter 41, the first sensor 45*a* on the side close to the first frontage 33*a* does not detect the shutter 41, while the second sensor 45*b* on the side close to the second frontage 33*b* detects the shutter 41.

Figure 6B:
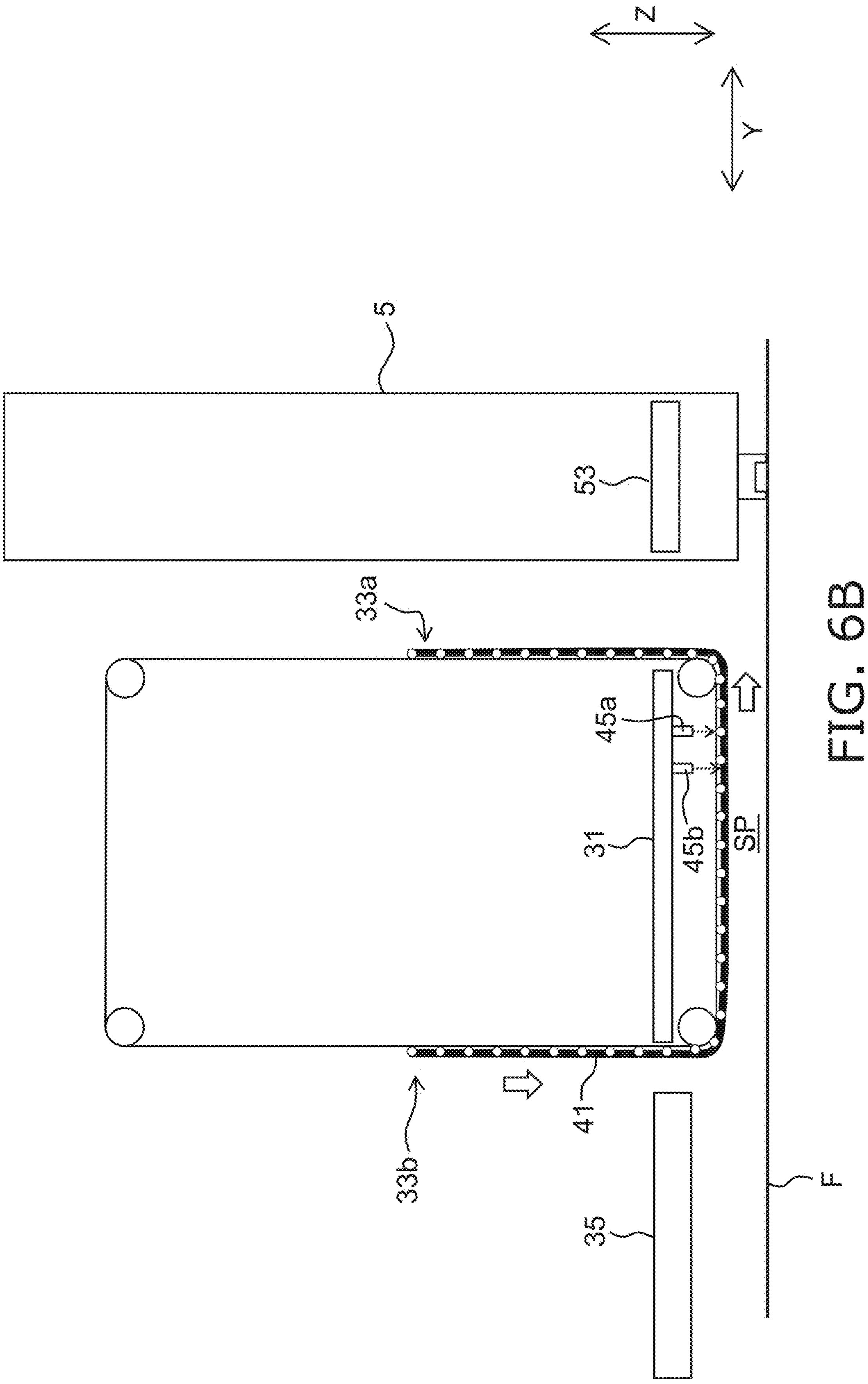
FIG. 6B is a diagram illustrating a state where the shutter is on the move to the first frontage.

When the shutter 41 starts moving and is passing through the space SP between the shelf 31 and the floor surface F, both the first sensor 45*a* and the second sensor 45*b* detect the shutter 41. However, in this case, as illustrated in FIG. 6B, the second frontage 33*b* is not completely closed by the shutter 41, and the first frontage 33*a* is not completely opened. In this case, the controller 7 determines that the shutter 41 is on the move to the first frontage 33*a*, and continues the movement of the shutter 41 to the first frontage 33*a*. FIG. 6B is a diagram illustrating a state where the shutter 41 is on the move to the first frontage 33*a*.

Figure 6C:
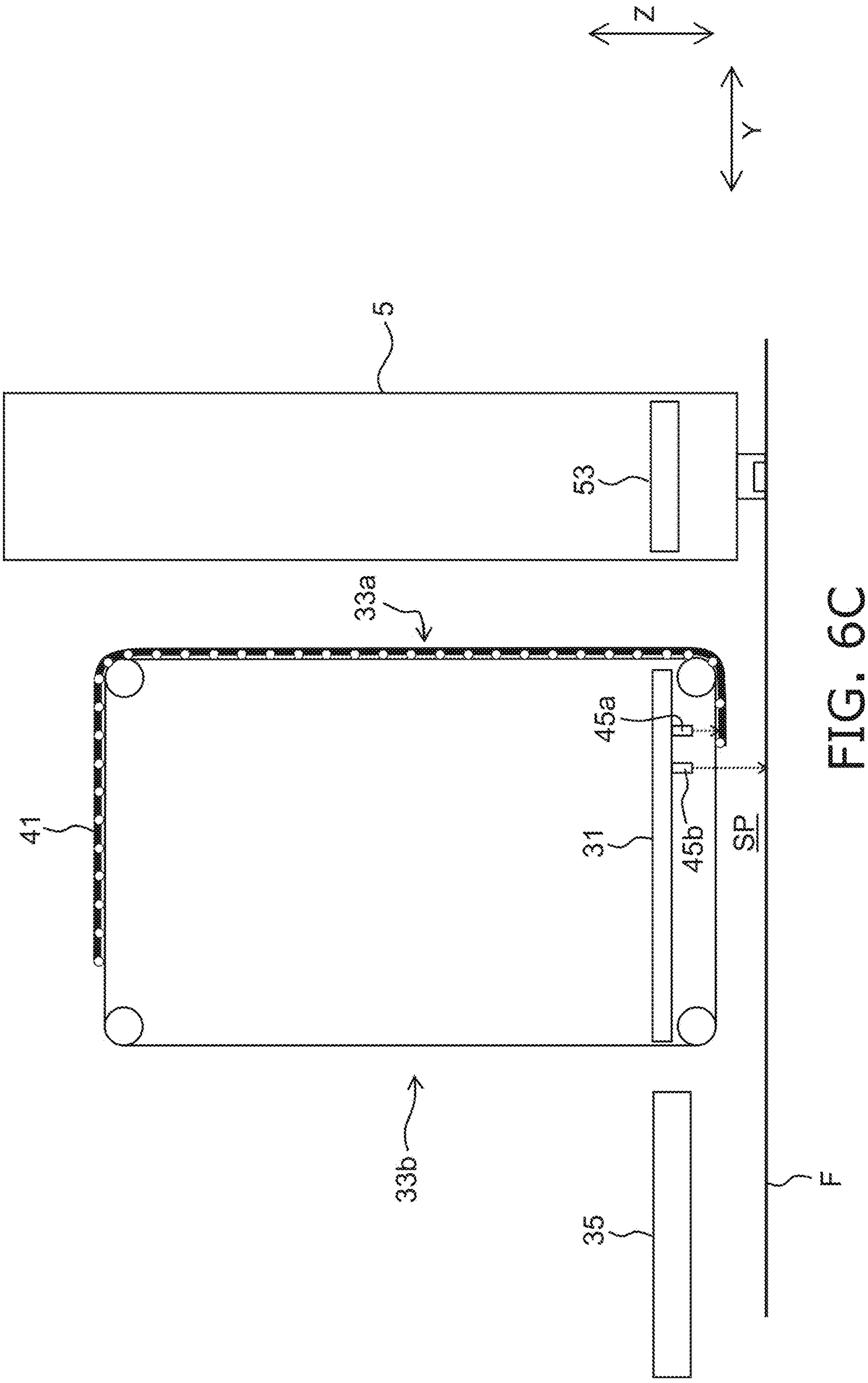
FIG. 6C is a diagram illustrating a state where the first frontage is closed by the shutter.

After that, as the shutter 41 moves more, the state arises where the first sensor 45*a* on the side close to the first frontage 33*a* detects the shutter 41, while the second sensor 45*b* on the side close to the second frontage 33*b* does not detect the shutter 41. In this case, as illustrated in FIG. 6C, the first frontage 33*a* is closed by the shutter 41, and the second frontage 33*b* is opened. Therefore, if the state where both the first sensor 45*a* and the second sensor 45*b* detect the shutter 41 changes to the state where the first sensor 45*a* detects the shutter 41 while the second sensor 45*b* does not detect the shutter 41, the controller 7 determines that the shutter 41 has closed the first frontage 33*a*, and stops the movement of the shutter 41 to the first frontage 33*a*. FIG. 6C is a diagram illustrating a state where the first frontage 33*a* is closed by the shutter 41.

In the state where the second frontage 33*b* is opened while the first frontage 33*a* is closed as illustrated in FIG. 6C, the operator W can pass through the second frontage 33*b* to enter the shelf 31, to perform a predetermined operation on the article A. On the other hand, the conveyance device 5 cannot extend the transfer device 53 to the shelf 31 because the first frontage 33*a* is closed. In this way, the safety device 4 inhibit the transfer device 53 of the conveyance device 5 from making access to the shelf 31 while the operator W makes access to the shelf 31, to ensure safety.

In this way, in this example embodiment, when moving the shutter 41 to switch the frontage to be closed, the shutter 41 passes through the space SP between the floor surface F and the shelf 31, to move from one of the frontages to the other frontage. In this way, for example, even if an abnormality occurs while the shutter 41 is moving so that the shutter 41 stops on the move from one frontage to the other frontage, the lower sides of the first frontage 33*a* and the second frontage 33*b* are closed by the shutter 41 as illustrated in FIGS. 5B and 6B. In other words, even if the shutter 41 stops on the way, the lower sides of the two frontages are not simultaneously opened. As a result, while the conveyance device 5 is operating, the operator W cannot either make access to the shelf 31 or go through the shelf 31 to move to the conveyance device 5 side. In addition, while the operator W is performing a predetermined operation on the shelf 31, or when the operator W is left in the shelf 31, the transfer device 53 cannot make access to the shelf 31.

Note that if neither the first sensor 45*a* nor the second sensor 45*b* detects the shutter 41 during movement of the shutter 41, the controller 7 determines that the shutter 41 is not in the normal position, and issues an abnormality alarm.

When the safety device 4 is started first time, or when the safety device 4 is started after recovery from abnormality, it may occur that the state of the shutter 41 (the position or the like of the shutter 41) cannot be recognized from the detection states of the shutter 41 by the first sensor 45*a* and the second sensor 45*b*. For instance, if an abnormality occurs in the state where both the first sensor 45*a* and the second sensor 45*b* detect the shutter 41, and then at restart, the controller 7 cannot recognize which direction the shutter 41 was moving in, or which position the shutter 41 is stopped at. In addition, for example, if the device is stopped in the state where neither the first sensor 45*a* nor the second sensor 45*b* detects the shutter 41, and then at restart, too, the controller 7 cannot recognize which direction the shutter 41 was moving in, or the position thereof as well.

Therefore, when the safety device 4 is started, the controller 7 allows the shutter 41 to move circularly along the first frontage 33*a*, the space SP between the shelf 31 and the floor surface F, the second frontage 33*b*, and the upper portion of the shelf 31, to cause or not cause the first sensor 45*a* and the second sensor 45*b* to detect the shutter 41. When causing the shutter 41 to move circularly at startup, in consideration of safely, the shutter 41 is moved in the direction starting from the lower portion of the second frontage 33*b* where the operator W exists, and then closing the second frontage 33*b*.

By performing the operation described above at startup, even if the state occurs in which the state of the shutter 41 cannot be recognized due to recovery from an abnormal state, startup of the device, or the like, the controller 7 can recognize the state of the shutter 41. For instance, when circularly moving the shutter 41, suppose that both the first sensor 45*a* and the second sensor 45*b* detect the shutter 41, and that afterward the state occurs in which the second sensor 45*b* still detects the shutter 41 while the first sensor 45*a* does not detect the shutter 41. Then, the controller 7 can recognize that the shutter 41 is in the state (at the position) to close the second frontage 33*b*.

Note that the startup operation described above may be finished without whole circular movement of the shutter 41, if one of the first sensor 45*a* and the second sensor 45*b* detects the shutter 41 after both sensors detect the shutter 41. In addition, it may be possible to circularly move the shutter 41 a plurality of times, so as to repeatedly generate detection and non-detection of the shutter 41 by the two sensors.

The example embodiment described above can also be described as follows.

An article shelf (e.g., the rack 3) includes a shelf (e.g., the shelf 31), two frontages (e.g., the first frontage 33*a* and the second frontage 33*b*), a shutter (e.g., the shutter 41), a drive assembly (e.g., the drive assembly 43), and a controller (e.g., the controller 7). The shelf is configured to place an article (e.g., the article A) at a position spaced apart from a floor surface (e.g., the floor surface F). The two frontages face each other in a direction (e.g., the Y direction) perpendicular to a width direction of the shelf (e.g., the X direction), to access to the shelf. The shutter opens one of the two frontages and closes the other. The drive assembly drives the shutter. The controller is configured or programmed to control the drive assembly to control movement of the shutter. In addition, when moving the shutter to switch the frontage to be closed, the controller is configured or programmed to cause the shutter to pass through a space between the floor surface and the shelf (e.g., the space SP).

In the article shelf described above, when causing the shutter to move to switch the frontage to be closed, the shutter passes through the space between the floor surface and the shelf, to move from one of the frontages to the other frontage. In this way, even if the shutter stops on the move from one frontage to the other frontage, at least one of the two frontages is closed on its lower side by the shutter, and hence it is possible to prevent two frontages from being simultaneously opened on lower sides thereof.

2. Other Example Embodiments

Although example embodiments of the present invention are described above, the present invention is not limited to the example embodiments described above, but can be variously modified within the scope of the present invention without deviating from the spirit thereof. In particular, a plurality of example embodiments and variations described in this specification can be arbitrarily combined as necessary.

Figure 7:
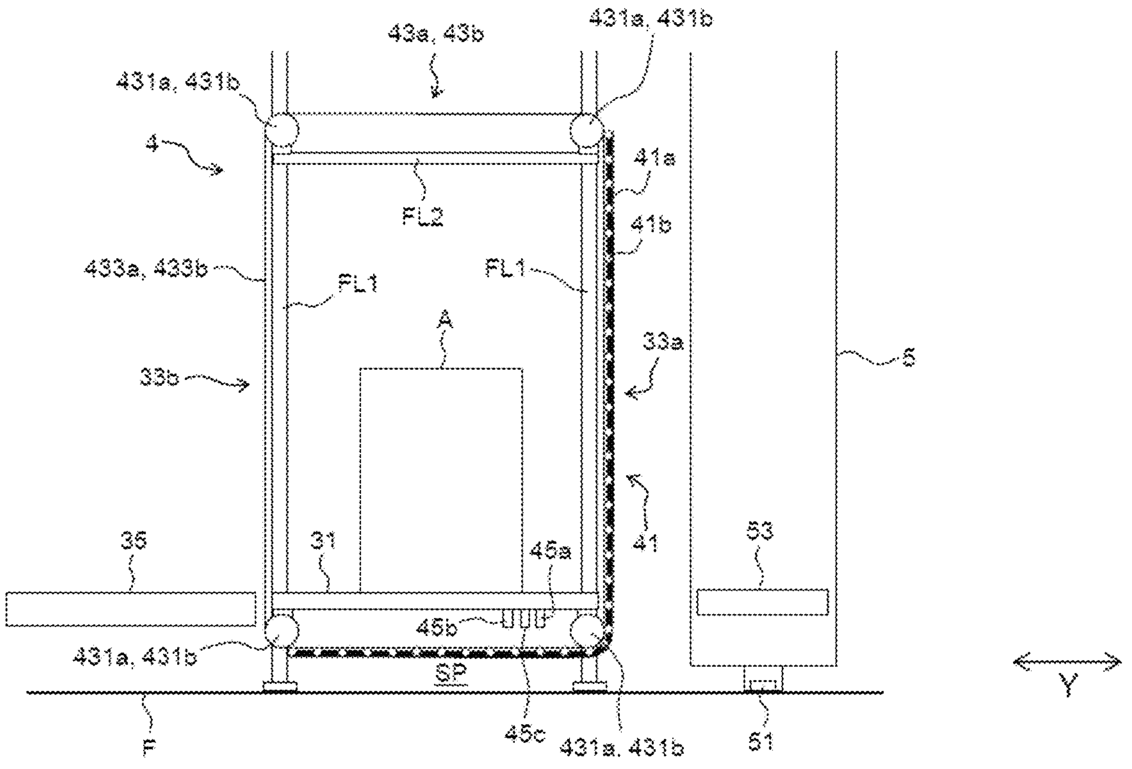
FIG. 7 is a diagram of a safety device viewed from a rack extending direction.

(A) The number of the sensors provided to detect the shutter 41 is not limited to two. For instance, another sensor (referred to as a third sensor 45*c*) may be disposed between the first sensor 45*a* and the second sensor 45*b*, as shown in FIG. 7. In other words, three sensors may be disposed side by side along the movement path of the shutter 41. By disposing more sensors, the controller 7 can perform more advanced control.

In this case, when the shutter 41 is undetected by one of three sensors, i.e., the first to third sensors 45*a* to 45*c*, the controller 7 determines to decrease the moving speed of the shutter 41 or to stop the shutter 41, based on the movement direction of the shutter 41.

Specifically, for example, when moving the shutter 41 in the direction to close the second frontage 33*b*, the controller 7 can perform the following control. If the shutter 41 is detected by all the first to third sensors 45*a* to 45*c*, and afterward the shutter 41 is undetected by only the first sensor 45*a*, the controller 7 decreases the moving speed of the shutter 41. After that, if the shutter 41 is undetected by the first sensor 45*a* and the third sensor 45*c*, the controller 7 stops the shutter 41. In this case, as the second sensor 45*b* continues detecting the shutter, it is understood that the end of the shutter is stopped between the third sensor 45*c* and the second sensor 45*b*.

In addition, when moving the shutter 41 in the direction to close the first frontage 33*a*, the controller 7 can perform the following control. If the shutter 41 is detected by all the first to third sensors 45*a* to 45*c*, and afterward the shutter 41 is undetected by only the second sensor 45*b*, the controller 7 decreases the moving speed of the shutter 41. After that, if the shutter 41 is undetected by the second sensor 45*b* and the third sensor 45*c*, the controller 7 stops the shutter 41. In this case, as the first sensor 45*a* continues detecting the shutter, it is understood that the end of the shutter is stopped between the third sensor 45*c* and the first sensor 45*a*.

(B) The safety device 4 described above can be provided not only to the rack 3 but also to a general shelf of the article A including two frontages.

(C) The shelf 31 may be able to move up and down in the Z direction. The shelf 31 that can move up and down may be, for example, a power slider, an elevating lift, or the like. In this way, for example, the operator W can make access from the floor surface F to the shelf 31. In addition, for example, an automatic guided vehicle (AGV) that travels on the floor surface F can access to the shelf 31.

(D) The space SP between the shelf 31 and the floor surface F may allow an automatic guided vehicle to enter. In this case, for example, the automatic guided vehicle is equipped with a shelf of the article A that can move in the up and down direction, and the automatic guided vehicle enters the space SP and uses the shelf to lift the article A placed on shelf 31, so that the article A can be transferred from the shelf 31 to the shelf.

As described above, the shutter 41 passes through the space SP between the shelf 31 and the floor surface F, to switch between the first frontage 33*a* and the second frontage 33*b*. Therefore, if there is an automatic guided vehicle and/or a human or the like in the space SP between the shelf 31 and the floor surface F, the switching of the frontage cannot be performed. As a result, it is possible to determine whether or not the frontage can be switched, without detecting whether or not an automated guided vehicle and/or a human or the like exist in the space SP between the shelf 31 and the floor surface F.

(E) The length of the shutter 41 may be any length as long as it is more than or equal to a length corresponding to the sum of the height of one frontage and the length of the shelf 31 in the Y direction. In addition, the length of the shutter 41 may be changeable in accordance with the length of the shelf 31 in the Y direction.

(F) The drivers 43*a* and 43*b* may further include a rotating structure that is configured to adjust tensions of the endless structures 433*a* and 433*b*, respectively. This rotating structure pushes or pulls the endless structure 433*a*, 433*b* wrapped around the four rotating structures 431*a*, 431*b*, to adjust the tension. In addition, it may also be possible that the four rotating structures 431*a*, 431*b* can move in any direction, and that the tension of the endless structure 433*a*, 433*b* is adjustable by adjusting the distance between the rotating structures 431*a*, 431*b*.

(G) The method of realizing the movement of the shutter 41 is not limited to the control by the controller 7 as described above. For instance, the movement of the shutter 41 may be realized by an operation of a button or the like.

Example embodiments of the present invention can be widely applied to article shelves on which an article is placed.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An article shelf comprising:

a shelf to hold an article at a position spaced from a floor surface;

two frontages facing each other in a direction perpendicular to a width direction of the shelf to provide access to the shelf;

a shutter to open one of the two frontages and to close the other; and two sensors side by side along a movement path of the shutter, to detect the shutter; wherein the movement path of the shutter defines a loop such that the shutter is circularly movable;

when moving to switch the frontage to be closed, the shutter passes through a space between the floor surface and the shelf, the shutter has a length corresponding to a sum of a height of one of the frontages and a length of the shelf in the direction perpendicular to the width direction, the sensors are in a vicinity of one of the frontages, and when the shutter is detected by one of the two sensors, the shutter closes one of the two frontages, the shutter continues to move if both the two sensors detect the shutter, and the shutter stops if one of the two sensors does not detect the shutter, and if a state of the shutter cannot be recognized using the sensors, the state of the shutter is recognized by circularly moving the shutter to cause the sensors to detect the shutter.

2. The article shelf according to claim 1, further comprising a drive assembly including a pair of drivers positioned with an interval therebetween, the interval being larger than a width of the shelf, to move the shutter while supporting opposite end portions of the shutter; wherein each of the drivers includes four rotating structures at four corners along a movement path of the shutter, and an endless structure wrapped around the four rotating structures, to support one of the opposite end portions of the shutter.

3. The article shelf according to claim 2, wherein the drive assembly is operable to rotate one of the four rotating structures of one of the pair of drivers, to move the shutter.

4. The article shelf according to claim 1, wherein the shutter continues to move if both the two sensors detect the shutter; and the shutter stops if one of the two sensors does not detect the shutter.

5. The article shelf according to claim 1, further comprising a third sensor side by side the two sensors along the movement path of the shutter, to detect the shutter.

6. The article shelf according to claim 4, wherein it is determined whether or not to stop the shutter if one of the two sensors does not detect the shutter, based on a movement direction of the shutter.

7. The article shelf according to claim 5, wherein it is determined whether or not to decrease the moving speed of the shutter or to stop the shutter if the shutter becomes undetected by one of the three sensors, based on the movement direction of the shutter.

* * * * *